United States Patent Office 3,462,400
Patented Aug. 19, 1969

3,462,400
COPOLYMERS OF ACRYLAMIDE AND N-ARAL-
KYL-2-AMINOALKYL ACRYLATE
Theodore L. Ashby and Clarence R. Dick, Lake Jackson, Tex., assignors to The Dow Chemical Company, Midland, Mich., a corporation of Delaware
No Drawing. Filed Feb. 16, 1966, Ser. No. 527,750
Int. Cl. C08f 19/00; C02b 1/20
U.S. Cl. 260—86.1                                    5 Claims

ABSTRACT OF THE DISCLOSURE

Copolymerization of acrylamide with a minor amount of a water-soluble salt of an N-aralkyl-2-aminoalkyl acrylate gives a novel water-soluble copolymer useful as a flocculant.

---

N-alkylaminoethyl acrylates and methacrylates can be prepared by esterification of an acrylic acid with an N-alkylaminoalcohol as described by Graves in U.S. Patent 2,138,763 or De Benneville in U.S. Patent 2,744,884. But N-aralkyl-2-aminoalkyl acrylates, which have significantly different properties because of the terminal aromatic group, have not been available until recently. Now these aralkylamino esters can be prepared by condensation of an aralkyl aziridine and an acrylic acid.

It has now been discovered that a highly effective cationic flocculating agent is obtained by copolymerization of a monomeric mixture consisting essentially of 98–60 weight percent of an acrylamide and 2–40 weight percent of a water-soluble salt of an N-aralkyl-2-aminoalkyl acrylate of the formula:

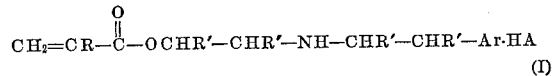
(I)

wherein R is H, Cl, or a $C_1$–$C_4$ alkyl group, each R' individually is H or a $C_1$–$C_4$ alkyl group, Ar is a $C_6$–$C_{14}$ aromatic group; and HA is a salt forming acid, to obtain a water-soluble copolymer having a viscosity of at least 2.0 centistokes as a 0.1 percent aqueous solution at 37.7° C. When dissolved or dispersed in water at a concentration as low as 1–5 parts per million (p.p.m.) these copolymers effectively flocculate such varied materials as illite silica, arrowroot starch, and raw sewage. Additives which produce rapid flocculation in p.p.m. concentrations in aqueous systems are eagerly sought for applications not economically feasible with present materials.

As employed herein, the term "water-soluble" means dispersible in water at a concentration of at least 0.1 weight percent to provide a visually homogeneous and substantially transparent solution which is infinitely dilutable with water.

The acrylamide monomers used in major proportion in preparing the new cationic copolymers have the formula:

$$CH_2=CR-CONH_2 \quad \text{(II)}$$

wherein R is H, Cl or a $C_1$–$C_4$ alkyl group. Preferred are acrylamide and methacrylamide although α-chloro- and α-butylacrylamide are also suitable.

The second essential monomer is a water-soluble salt of an aralkylaminoalkyl acrylate of the formula:

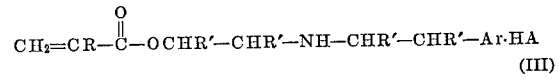
(III)

wherein R is H, Cl, or a $C_1$–$C_4$ alkyl group, each R' individually is H or a $C_1$–$C_4$ alkyl group, Ar is a $C_6$–$C_{14}$ aromatic group, and HA is a salt forming acid.

These aromatic aminoacrylates can be prepared by reaction of a vinylaromatic compound such as styrene, p-chlorostyrene, t-butyl-p-styrene, alpha-methylstyrene or vinylnaphthalene with an ethyleneimine by the process of Bestian U.S. Patent 2,654,737 followed by reaction of the aralkylaziridine with an appropriate acrylic acid. A particularly convenient synthesis is described in the pending U.S. application S.N. 394,333 filed by McFadden and Dick on Sept. 3, 1964 now abandoned. Preferred comonomers are aminoacrylates prepared from an acrylic acid and a phenethylaziridine, e.g., a comupound of the formula:

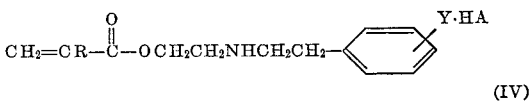
(IV)

wherein R and Y individually are H, Cl, or a $C_1$–$C_4$ alkyl group, and HA is a salt forming acid.

These aminoacrylates are normally prepared and used as a water-soluble salt, usually the hydrochloride, obtained by neutralization of the amino group with a suitable acid. Other salt-forming acids (HA) including hydrobromic acid, sulfuric acid, or organic sulfonic acid can be used.

The acrylamide and N-aralkyl-2-aminoalkyl acrylate readily copolymerize to give the corresponding copolymers in high yield. For high flocculent activity, the amount of aminoacrylate incorporated in the copolymer is critical. With less than 2–5 weight percent of the cationic monomer, the cationic content of the copolymer is too low for optimum activity. Yet for effective flocculation a cationic monomer content greater than about 40 weight percent is neither necessary nor economically desirable.

In practice the cationic copolymers are preferably prepared by polymerization of an aqueous solution containing 10 to 40 weight percent of the comonomers at 20–100° C. and advantageously at 30–70° C. The aqueous copolymerization is catalyzed by such vinyl polymerization catalysts as hydrogen peroxide, potassium persulfate, or azobisisobutyronitrile but preferably by a redox catalyst such as an alkyl hydroperoxide and sodium bisulfite. A catalyst concentration of about 50–1000 p.p.m. based on monomer is generally satisfactory.

To achieve high flocculent activity, a copolymer with a viscosity of at least 2.0 centistokes (cs.) at 37.7° C. as a 0.1 percent aqueous solution is required. Such a copolymer is obtained by heating the polymerizing mixture after the initial exotherm at 30–70° C. for a suitable time, normally about 4–10 hours. The high molecular weight cationic copolymers are obtained as water-soluble gels which are conveniently handled as 5–10 weight percent aqueous solutions or dispersions. Alternately the solid copolymer in salt form can be precipitated with a suitable diluent such as acetone, methanol, or dioxane and then dried to obtain a free-flowing powder readily dispersible in water.

When used to flocculate finely-divided solids in aqueous suspension these cationic copolymers are effective at low concentrations. Usually less than 100 p.p.m. of the copolymer added as an aqueous solution of a water-soluble salt is adequate to flocculate the suspended solids and permit recovery of an aqueous phase with a reduced content of suspended solids by filtration, settling or other conventional means.

Within the general scope of the present invention, optimum reaction conditions and compositions for a particular application can be determined in routine manner. The following examples illustrate further the present invention. Unless otherwise indicated, all parts and percentages are by weight.

EXAMPLE I.—10/90 CATIONIC COPOLYMER

A solution of 5 parts of recrystallized N-(β-phenethyl)-

2-aminoethyl methacrylate hydrochloride, 45 parts of acrylamide, 183 parts of deionized water, 1 part of a 0.08 percent solution of sodium ethylenediaminetetraacetate, and 0.29 part of t-butyl-hydroperoxide was thoroughly mixed, filtered and charged into a reactor. After purging the reactor with nitrogen, 10 parts of a 10 percent solution of NaHSO₃ was added. Rapid polymerization occurred with a temperature rise to 32° C. After 8 minutes, 100 parts of water was added to reduce the viscosity of the mixture. Within another 10 minutes the viscosity became too great for further stirring. Then polymerization was continued without agitation at 30–40° C. for 1.75 hours and at about 60° C. for 6 hours. The reactor was cooled and the gelled copolymer recovered as a free-flowing powder by precipitation with acetone and drying. The white cationic copolymer dissolved in deionized water had a 0.1 percent aqueous solution viscosity of 3.29 centistokes at 37.7° C.

EXAMPLE II.—OTHER CATIONIC COPOLYMERS

Following the general procedure of Example I, other N-aralkyl - 2-aminoalkyl acrylate copolymers with an acrylamide can be prepared.

(A) Copolymerization of 6 parts of N-(β-phenethyl)-2-aminoethyl acrylate hydrochloride with 240 parts of acrylamide using the t-butylhydroperoxide —NaHSO₃ catalyst for 1.6 hours at 30–35° C. and 4 hours at 65° C. gave a white solid copolymer in 95 percent yield having a 0.25 percent aqueous solution viscosity in water of 95.4 centistokes at 37.7° C., equivalent to about 11–12 cs. as a 0.1 percent solution.

(B) Copolymerization of 15 parts of N-(β-phenethyl)-2-aminoethyl acrylate hydrochloride and 35 parts of acrylamide for 4 hours at 35° C. and 5.2 hours at 70° C. gave a high yield of a white copolymer having a 0.1 percent viscosity in water of 7.92 cs. as 37.70° C.

EXAMPLE III.—FLOCCULENT ACTIVITY

To illustrate the flocculent activity of the new cationic copolymers, 100 ml. portions of standard 5 percent aqueous suspension of arrowroot starch or illite silica were used. To each test slurry in a stoppered 100 ml. graduate was added 3⅓ ml. portions of a 0.05 percent aqueous solution of the test copolymer with gentle intermixing by 3 inversions of the graduate after each copolymer addition. After the final addition and mixing, the time for the treated slurry to settle from the 90 ml. to 50 ml. mark of the graduate was measured with a stop watch.

As shown by the results given in Table I, the cationic copolymers are effective flocculants, although their activity is of course influenced by the nature of the suspended solids. For comparison, Separan NP-10, a commercial, non-ionic, high molecular weight polyacrylamide tested under similar conditions is ineffective with arrowroot starch at 5 p.p.m. but gives a flocculation rate of 60 cm./min. at 5 p.p.m. for the illite silica suspension.

TABLE I.—FLOCCULATION DATA

| Test | Cationic¹ Copolymer | Viscosity,² (cs.) | Flocculation rate, cm./min. | | | |
|---|---|---|---|---|---|---|
| | | | Arrowroot Starch | | Illite Silica | |
| | | | 5 p.p.m. | 10 p.p.m. | 5 p.p.m. | 10 p.p.m. |
| 3-1 | 10/90 | 3.29 | Poor | Poor | 130 | |
| 3-2 | 20/80 | ³(95.4) | 37 | 48.5 | 96.5 | 132 |
| 3-3 | 20/80 | 7.1 | 45.5 | 49.5 | 51 | 99 |
| 3-4 | 20/80 | 6.1 | 28 | 45.5 | 101.5 | 101.5 |
| 3-5 | 20/80 | 11.2 | 31 | 42 | 96.5 | 152 |
| 3-6 | 20/80 | 14.3 | 29.5 | 42.5 | 73.5 | 127 |
| 3-7 | 30/70 | 7.9 | 28 | 35.5 | 57 | 68.5 |

¹ Parts N-(β-phenethyl)-2-aminoethyl acrylate hydrochloride/parts acrylamide.
² 0.1 percent aqueous solution at 37.7° C.
³ 0.25 percent aqueous solution at 37.7° C.

We claim:
1. A water-soluble copolymer useful as a flocculant consisting essentially of:
 (A) 98–60 weight percent of an acrylamide of the formula:

$$CH_2=CR—CONH_2$$

wherein R is H, Cl or a $C_1$–$C_4$ alkyl group, copolymerized with
 (B) 2–40 weight percent of an N-aralkyl-2-aminoalkyl acrylate of the formula:

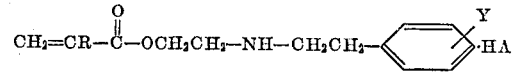

wherein R is H, Cl, or a $C_1$–$C_4$ alkyl group, each R' individually is H or a $C_1$–$C_4$ alkyl group, Ar is a $C_6$–$C_{14}$ aromatic group, and HA is a salt forming acid;

said copolymer having a viscosity of at least 2.0 centistokes as a 0.1 percent aqueous solution at 37.7° C.

2. The copolymer of claim 1 wherein the aminoacrylate has the formula:

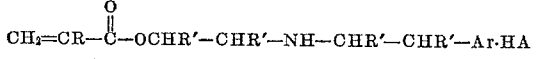

wherein R and Y individually are H, Cl or a $C_1$–$C_4$ alkyl group.

3. The copolymer of claim 2 wherein the amide is acrylamide.

4. The copolymer of claim 2 wherein the amide is methacrylamide.

5. The copolymer of claim 2 consisting essentially of copolymerized acrylamide and N-(β-phenethyl)-2-aminoethyl acrylate hydrochloride having a viscosity of 2.0–15.0 centistokes as a 0.1 percent aqueous solution at 37.7° C.

References Cited

UNITED STATES PATENTS

| | | | |
|---|---|---|---|
| 2,138,031 | 11/1938 | Graves | 260—486 |
| 2,138,763 | 11/1938 | Graves. | |
| 2,831,841 | 4/1958 | Jones | 260—89.7 |
| 2,834,765 | 5/1958 | De Benneville | 260—486 |
| 2,990,403 | 6/1961 | Gehsham et al. | 260—486 |
| 3,321,649 | 5/1967 | De Benedictis et al. | |

HARRY WONG, Jr., Primary Examiner

U.S. Cl. X.R.

210—42; 260—29.6, 79.3, 482